(12) United States Patent
Oishi

(10) Patent No.: US 7,798,816 B2
(45) Date of Patent: Sep. 21, 2010

(54) ROTARY CONNECTOR DEVICE

(75) Inventor: Hiroshi Oishi, Tokyo (JP)

(73) Assignee: Niles Co., Ltd., Tokyo (JP)

( * ) Notice: Subject to any disclaimer, the term of this patent is extended or adjusted under 35 U.S.C. 154(b) by 0 days.

(21) Appl. No.: 12/457,618

(22) Filed: Jun. 17, 2009

(65) Prior Publication Data

US 2009/0317994 A1      Dec. 24, 2009

(30) Foreign Application Priority Data

Jun. 19, 2008  (JP) .............................. 2008-160647

(51) Int. Cl.
*H01R 39/00* (2006.01)
(52) U.S. Cl. ....................................................... 439/15
(58) Field of Classification Search ................... 439/15, 439/164

See application file for complete search history.

(56) References Cited

U.S. PATENT DOCUMENTS

| | | | |
|---|---|---|---|
| 5,242,309 A * | 9/1993 | Hasegawa | 439/15 |
| 5,647,753 A * | 7/1997 | Ishikawa et al. | 439/15 |
| 5,752,844 A * | 5/1998 | Kawamoto | 439/164 |
| 6,299,453 B2 * | 10/2001 | Matsumoto | 439/15 |
| 6,764,326 B2 * | 7/2004 | Matsumoto et al. | 439/164 |
| 7,223,104 B2 * | 5/2007 | Suenaga | 439/15 |
| 7,425,143 B2 * | 9/2008 | Mitsui | 439/164 |

FOREIGN PATENT DOCUMENTS

JP      2000-003640      1/2000

* cited by examiner

*Primary Examiner*—Briggitte R Hammond
(74) *Attorney, Agent, or Firm*—Rader, Fishman & Grauer PLLC

(57) ABSTRACT

A rotary connector device is provided for restraining an error of rotational transmission between a steering wheel and a steering-angle sensor and restricting an increase of a steering-wheel detection error, making it possible to perform timely vehicle control. The rotary connector has: a body which is supported at a combination switch side and is adapted to pass a steering shaft; a rotor adapted to pass the steering shaft; and an attachment adapted to rotatably couple the rotor to the body and conjunctively rotate relative to the rotor, sensor-engagement recessed portions engaging with a steering-angle sensor to transmit a rotation, the recessed portions being provided at the attachment, wherein wheel-engagement protrusions engaging with a steering wheel are provided at the attachment.

2 Claims, 6 Drawing Sheets

(A)

(B)

US 7,798,816 B2

ROTARY CONNECTOR DEVICE

CROSS-REFERENCE TO RELATED APPLICATION

This application claims priority under 35 USC 119 from Japanese Patent Application No. 2008-160647, the disclosure of which is incorporated by reference herein.

BACKGROUND OF THE INVENTION

1. Field of the Invention

The present invention relates to a rotary connector device that electrically connects between a body of an automobile and a steering wheel.

2. Description of the Related Art

A conventional rotary connector device of this type is as shown in FIGS. 10 and 11, for example. The conventional rotary connector device 101 is mounted to a vehicle-sided combination switch 103 attached to a steering shaft. Between the rotary connector device 101 and the combination switch 103, a steering-angle sensor 105 which detects a steering angle of the steering wheel 111 is interposed for the sake of various controls of an automobile.

A pair of engagement bosses 109 are protruded at a disk 107 which is a rotation-side member of the rotary connector device 101, and are engaged with the counterparts of the steering wheel 111, and the disk 107 is conjunctively rotatable relative to the steering wheel 111.

The rotary connector device 101 and the steering-angle sensor 105 are coupled to each other by means of an engagement portion 113. The engagement portion 113 is provided independently of the disk 107, is attached to the disk 107, and extends to the steering-angle sensor 105. An engagement groove 113a is formed on an outer circumferential face of the engagement portion 113, and is engaged with a joint protrusive portion 105a which is formed on an inner circumferential face of a deceleration gear of the steering-angle sensor 105.

Therefore, when the steering wheel 111 rotates, such rotation is transmitted to the steering-angle sensor 105 via an engagement boss 109, the disk 107, the engagement groove 113a, and the joint protrusive portion 105a, and a steering angle can be detected.

However, the engagement portion 113 is attached to the disk 107, and is structured to transmit a rotation from the disk 107 to the steering-angle sensor 105 via an engagement between the engagement groove 113 and the joint protrusive portion 105a. Thus, the rotation is transmitted via three engagements between the steering wheel 111 and the disk 107; between the engagement portion 113 and the steering-angle sensor 105; and between the disk 107 and the engagement portion 113. Therefore, a large margin of error may occur to transmission of the rotary angle, due to a backlash occurring among the respective members.

Such a large margin of error emerges as an increase of a steering-angle detection error of the steering-angle sensor 105 with respect to steering of the steering wheel 111, and there has been a problem that a limitation to timely vehicle control occurs.

Patent Document 1: Japanese Laid-open Patent Application No. 2000-3640

DISCLOSURE OF THE INVENTION

Problem(s) to be Solved by the Invention

The problem to be solved by the invention is that a large margin of error occurs to rotational transmission between the steering wheel 111 and the steering-angle sensor 105 and emerges as an increase of a steering-angle detection error, and a limitation to a timely vehicle control occurs.

SUMMARY OF THE INVENTION

Means for Solving the Problem

A rotary connector device of the present invention is adapted to restrain an error of rotational transmission between a steering wheel and a steering-angle sensor, restrict an increase of a steering-angle detection error, and perform timely vehicle control, and thus, is primarily characterized by having:

a fixing-side member which is supported at a stationary side and is adapted to pass a steering shaft;

a rotation-side member adapted to pass the steering shaft; and an attachment adapted to rotatably couple the rotation-side member to the fixing-side member and conjunctively rotate relative to the rotation-side member, sensor-engagement portions engaging with a steering-angle sensor to transmit a rotation, the sensor-engagement portions being provided at the attachment, wherein wheel-engagement portions engaging with a steering wheel are provided at the attachment.

Advantageous Effect(s) of the Invention

According to the present invention, with the primary characteristics, between a steering wheel and a steering-angle sensor, a rotation can be transmitted owing to two engagements, i.e., an engagement between the steering wheel and an attachment and an engagement between the attachment and the steering-angle sensor, an increase of a steering-angle detection error is restrained, and timely vehicle control can be performed.

DESCRIPTION OF THE PREFERRED EMBODIMENTS

Best Mode for Carrying out the Invention

An object of restraining an error of rotational transmission between a steering wheel and a steering-angle sensor, restricting an increase of a steering-angle detection error, and performing timely vehicle control, has been achieved by providing a wheel engagement portion engaging with a steering wheel at an attachment.

Embodiment(s)

Figure 1:
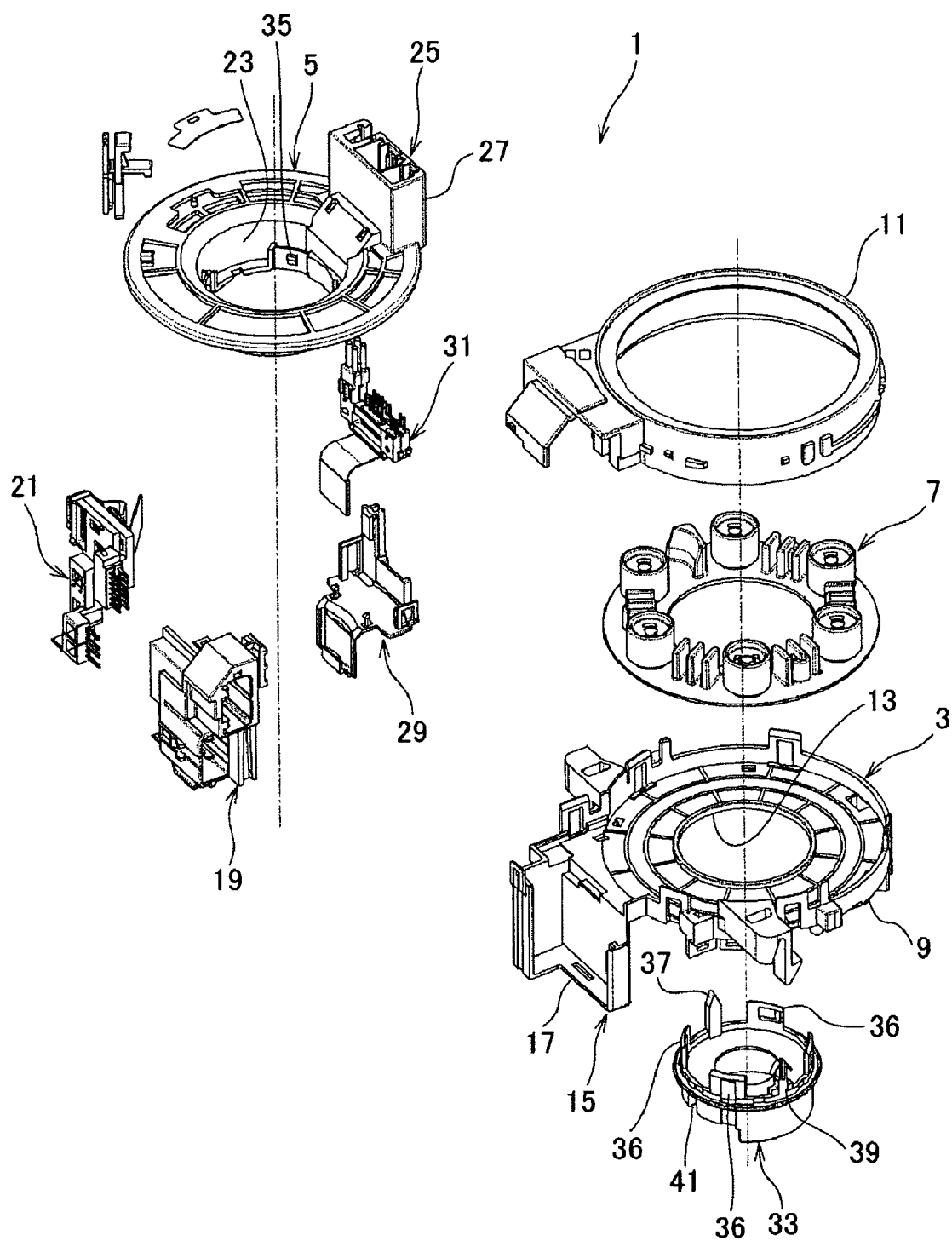
FIG. 1 is an exploded perspective view of a rotary connector device (first embodiment)
Figure 2:
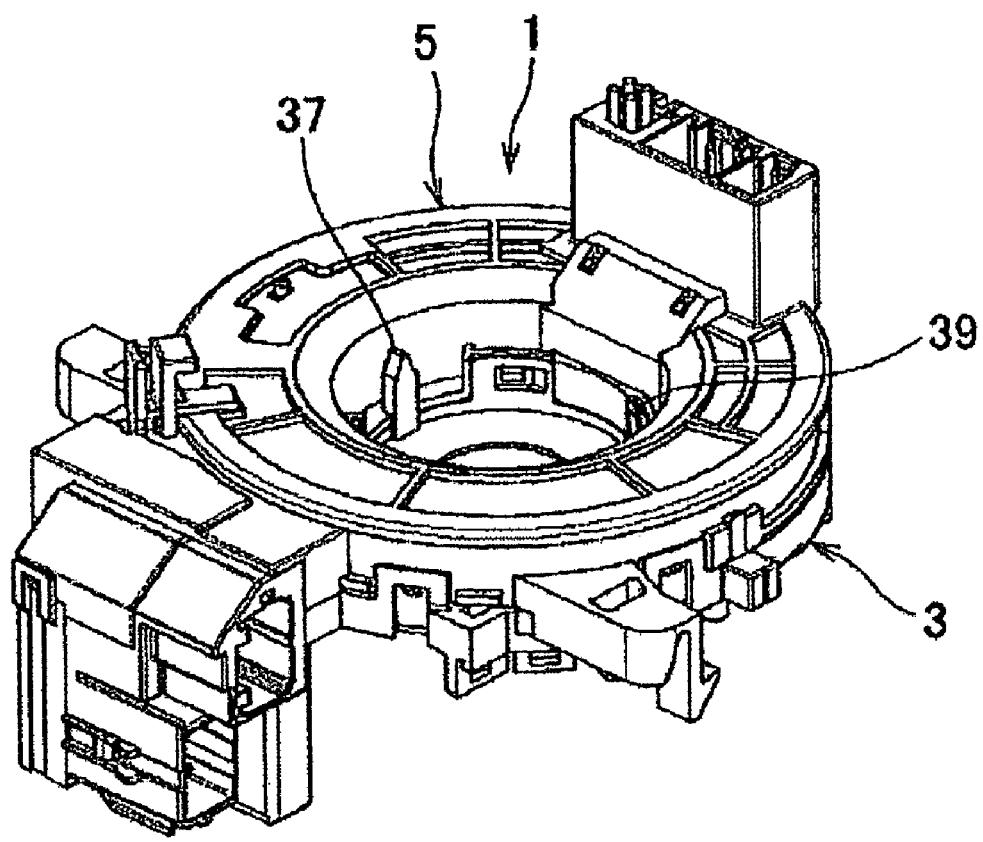
FIG. 2 is a perspective view when the rotary connector device is seen from a steering wheel side (first embodiment)
Figure 3:
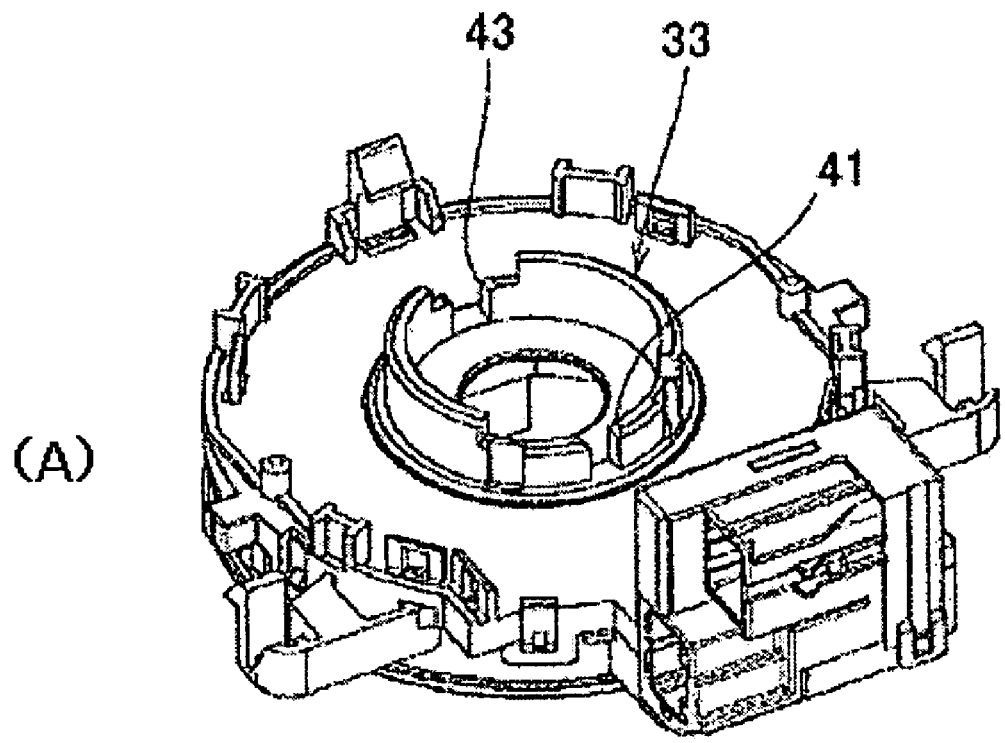
FIG. 3A is a perspective view when the rotary connector device is seen from a steering-angle sensor side (first embodiment)
FIG. 3B is a plan view when the steering-angle sensor is seen from a rotary connector device side (first embodiment)
Figure 3:
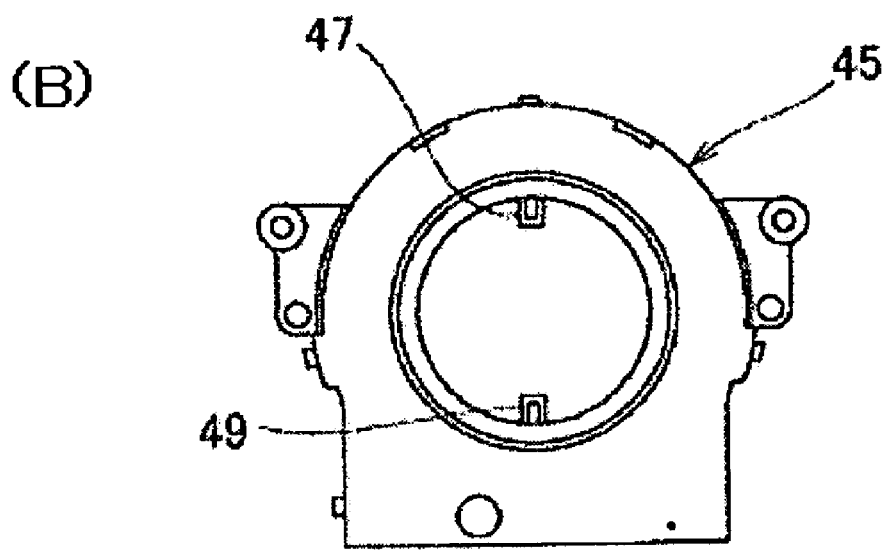

FIG. 1 is an exploded perspective view of a rotary connector device according to one embodiment of the present invention; FIG. 2 is a perspective view when the rotary connector device is seen from a steering wheel side; FIG. 3A is a perspective view when the rotary connector device is seen from a steering-angle sensor side; and FIG. 3B is a plan view when the steering-angle sensor is seen from the rotary connector device side.

The rotary connector device 1, shown in FIGS. 1 to 3A and 3B, electrically connects a horn and an air bag unit or the like, provided at the steering wheel side of an automobile, to a body side of the automobile. The rotary connector device 1 has: a body 3 as a fixing-side member; a rotor 5 as a rotation-side member; an idle spacer 7; and a flat cable (not shown).

The body 3 is formed by engaging a case 11 to a bottom cover 9. The bottom cover 9 is fixed to a combination switch side fixed to a steering column (not shown).

The bottom cover 9 is formed in a doughnut shape with a resin or the like; a fixing-side hole portion 13 for passing a steering shaft is formed at a center part; and a fixing-side terminal support portion 17 constituting a fixing-side connector portion 15 is formed at a side part. A fixing-side holder 19 having held a fixing-side terminal 21 is supported at the fixing-side terminal support portion 17, and a fixing-side connector portion 15 is constituted.

The rotor 5 is disposed at a lower face side of a steering wheel, and is conjunctively rotatable relative to the steering wheel. The rotor 5 is formed in a doughnut shape with a resin or the like; a rotation-side hole portion 23 for passing the steering shaft is formed at a center part; and a rotation-side terminal support portion 27 constituting a rotation-side connector portion 25 is formed at a side part. A rotation-side holder 29 having held a rotation-side terminal 31 is supported at the rotation-side terminal support portion 27, and a rotation-side connector portion 25 is constituted.

This rotor 5 is rotatably coupled to the bottom cover 9 of the body 3 via an attachment 33. For the sake of this coupling, on an inner circumference of the rotation-side hole portion 23, coupling protrusions 35 are formed at four sites in an layout at an angle of 90 degrees in an circumferential direction, for example.

Figure 4:
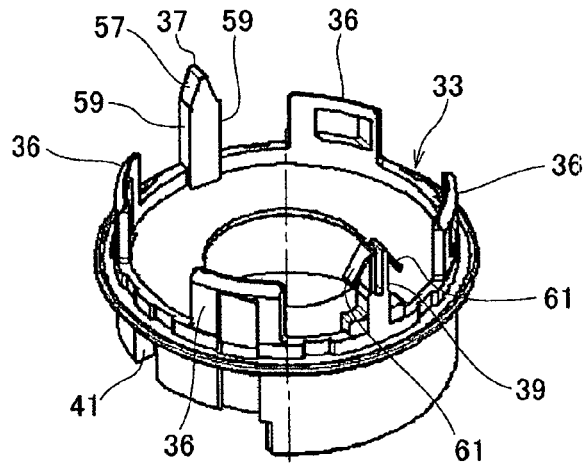
FIG. 4 is a perspective view of an attachment (first embodiment)

FIG. 4 is a perspective view of the attachment.

The attachment 33 is cylindrically formed with a resin. As shown in FIGS. 1 to 4, the attachment 33 has: four elastic tongue pieces 36, each of which is disposed at an angle of 90 degrees in a circumferential direction at one end in an axial direction; and wheel-engagement protrusions 37, 39 as two steering-wheel engagement portions, each of which is disposed oppositely between the elastic tongue pieces 36; and at the other side in the axial direction, sensor-engagement recessed portions 41, 43 are oppositely disposed as two steering-angle sensor engagement portions. The sensor-engagement recessed portion 43 is formed to be slightly larger in a width in a circumferential direction than the sensor-engagement recessed portion 41, and a preliminary engagement is performed.

The attachment 33 is attached between the fixing-side hole portion 13 and the rotation-side hole portion 23 from the side of the bottom cover 9, and the elastic tongue piece 36 engagingly locks a coupling protrusion 35 in the rotation-side hole portion 23, whereby the rotor 5 is rotatably coupled to the body 3.

The wheel-engagement protrusions 37, 39 are adapted to be protruded in an axial direction of a steering shaft along an inner circumference of the rotation-side hole portion 23. These wheel-engagement protrusions 37, 39 engage with wheel-engagement recessed portions 53, 55 at the side of the steering wheel, allowing the attachment 33 and the rotor 5 to be conjunctively rotatable relative to the steering wheel. A relationship between the wheel-engagement protrusions 37, 39 and the wheel-engagement recessed portions 53, 55 will be described later. The sensor-engagement recessed portions 41, 43 engage with sensor-engagement protrusive portions 47, 49 of a steering-angle sensor 45 provided at a stationary side.

At this time, the sensor-engagement recessed portion 41 tightly engages with the sensor-engagement protrusive portion 47 to rotate the sensor-engagement protrusive portion 47, and the sensor-engagement recessed portion 43 loosely engages with the sensor-engagement protrusive portion 49 to perform a preliminary engagement. Owing to this engagement, a rotation of the steering wheel side is transmitted to the steering-angle sensor 45 that is supported at a combination switch provided at the stationary side.

The idle spacer 7 is rotatably arranged between the rotor 5 and the body 3. A flat cable is wound via the idle spacer 7. Both ends of the flat cable are connected to the fixing-side terminal 21 and the rotation-side terminal 31.

Figure 5:
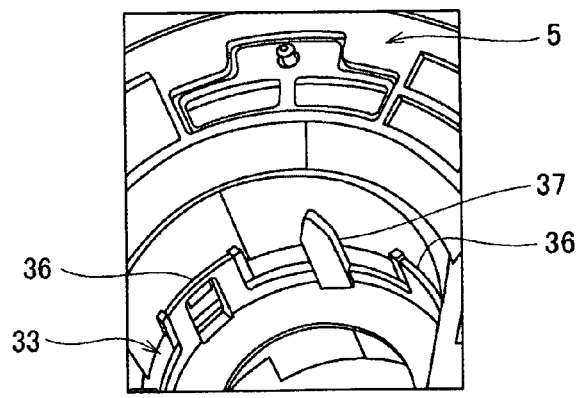
FIG. 5 is a perspective view of essential parts, showing one wheel-engagement protrusion of the attachment (first embodiment)
Figure 6:
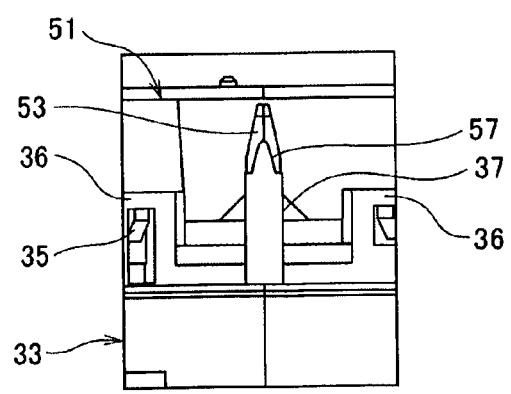
FIG. 6 is a front view of essential parts, showing an engagement between one wheel-engagement protrusion of the attachment and a wheel-engagement recessed portion of a steering wheel (first embodiment)
Figure 7:
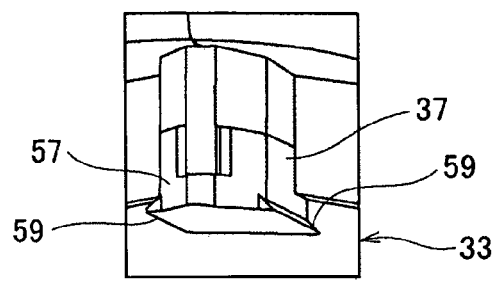
FIG. 7 is an enlarged perspective view of essential parts, showing one wheel-engagement protrusion of the attachment (first embodiment)
Figure 8:
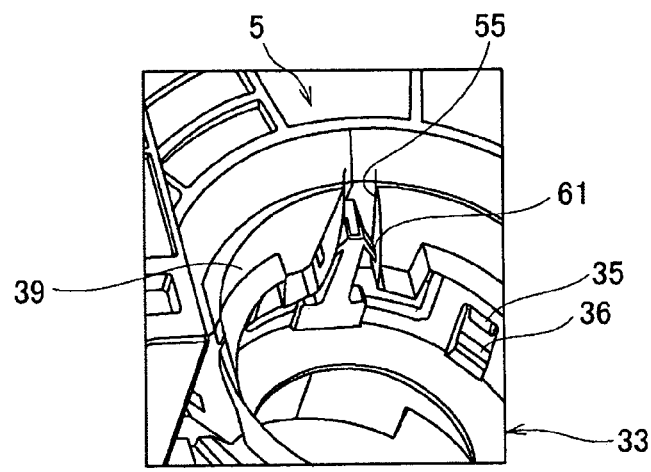
FIG. 8 is a perspective view of essential parts, showing an engagement between the other wheel-engagement protrusion of the attachment and the wheel-engagement recessed portion of the steering wheel (first embodiment)
Figure 9:
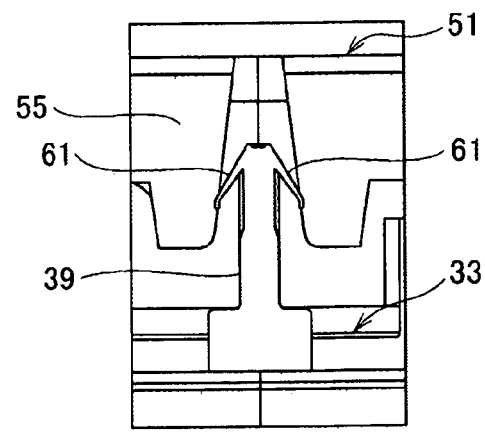
FIG. 9 is a front view of essential parts, showing an engagement between the other wheel-engagement protrusion of the attachment and the wheel-engagement recessed portion of the steering wheel (first embodiment)
Figure 10:
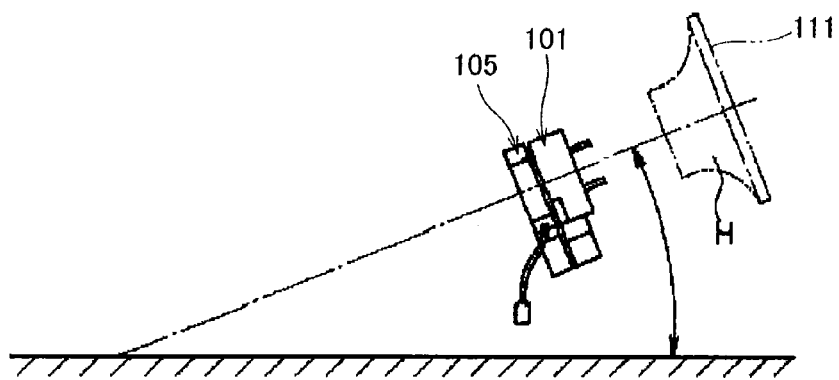
FIG. 10 is a side view showing a relationship between the steering wheel; and the rotary connector device and a steering-angle sensor (conventional)
Figure 11:
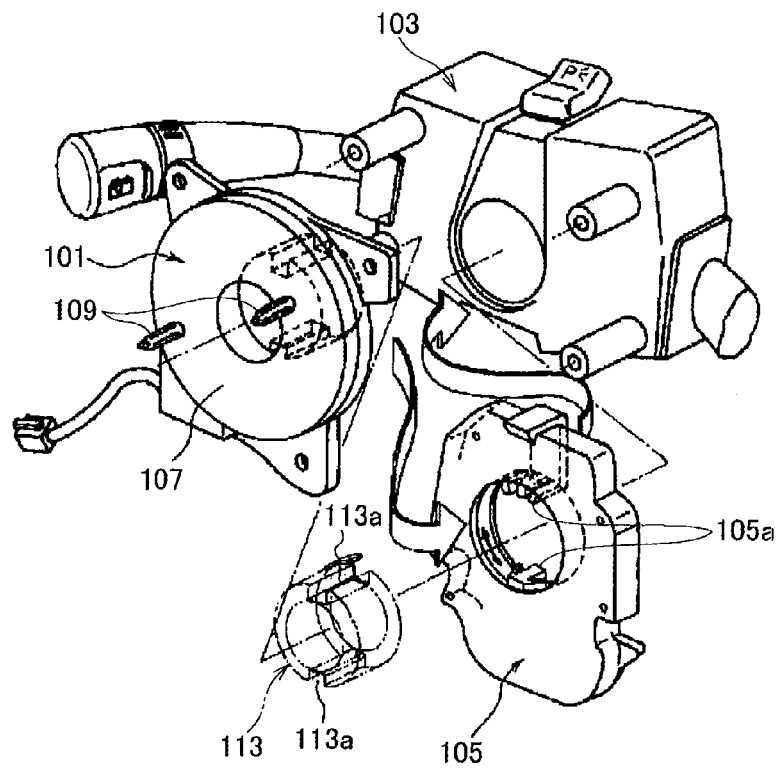
FIG. 11 is an exploded perspective view showing a relationship among the rotary connector device, the steering-angle sensor, and a combination switch (conventional).

FIG. 5 is a perspective view of essential parts, showing one wheel-engagement protrusion of the attachment; FIG. 6 is a front view of essential parts, showing an engagement between one wheel-engagement protrusion of the attachment and a wheel-engagement recessed portion of the steering wheel; FIG. 7 is an enlarged perspective view of essential parts, showing one wheel-engagement protrusion of the attachment; FIG. 8 is a perspective view of essential parts, showing an engagement between the other wheel-engagement protrusion of the attachment and the wheel-engagement recessed portion of the steering wheel; and FIG. 9 is a front view of the same essential parts.

As shown in FIGS. 1 to 6, one wheel-engagement protrusion 37 of the attachment 33 tightly engages, without looseness, with one wheel-engagement recessed portion 53 of a steering wheel 51, allowing the rotor 5 to be conjunctively rotatable relative to the steering wheel 51. As shown in FIGS. 1 to 4, 8, and 9, the other wheel engagement protrusion 39 of the attachment 33 elastically engages with the other wheel-engagement recessed portion 55 of the steering wheel 51, and maintains a preliminary engagement.

As shown in FIGS. 1 to 7, in one wheel-engagement protrusion 37, a tip end part 57 is formed in a tapered shape, and protrusive edge parts 59 for crushing are formed at both ends.

As shown in FIGS. 1 to 4, 8, and 9, in the other wheel-engagement protrusion 39, a pair of elastic piece portions 61 for elastic contact are formed at tip end parts.

Therefore, if the steering-angle sensor 45 and the rotary connector device 1 are mounted to a combination switch, sensor-engagement recessed portions 41, 43 at the side of the rotary connector device 1 engage with the sensor-engagement protrusive portions 47, 49 of the steering-angle sensor 45.

In addition, if the steering wheel 51 is coupled to a steering shaft, one wheel-engagement protrusion 37 of the attachment 33 engages with the wheel-engagement recessed portion 53 at the side of the steering wheel 51 so as to be inserted in an axial direction of the steering shaft. By means of this engagement, the protrusive edge portion 59 is crushed along a substantially circumferential direction of the rotation-side hole portion 23. Therefore, the wheel-engagement protrusion 37 tightly engages, without looseness, with one wheel-engagement recessed portion 53 of the steering wheel 51, allowing the rotor 5 to be conjunctively rotatable relative to the steering wheel 51. Further, rotation of the steering wheel 51 is transmitted from the attachment 33 to the sensor-engagement protrusive portions 47, 49 of the steering-angle sensor 45.

The other wheel-engagement protrusion 39 of the attachment 33 elastically engages with the other wheel-engagement recessed portion 55 of the steering wheel 51 due to deformation of an elastic piece portion 61, and maintains a preliminary engagement. Owing to this preliminary engagement, even when one wheel-engagement protrusion 37 is damaged, engagement can be maintained by means of the other wheel-engagement protrusion 39.

Therefore, if the steering wheel 51 rotates, the rotor 5 conjunctively rotates relative thereto, via the wheel-engagement recessed portion 53, the wheel-engagement protrusion 37, and the attachment 33. In addition, if the steering wheel 51 rotates, such rotation is transmitted to the wheel-engagement recessed portion 53, the wheel-engagement protrusion 37, the attachment 33, the sensor-engagement recessed portion 41, and the sensor-engagement protrusive portion 47 of the steering-angle sensor 45. The steering-angle sensor 45 performs a predetermined computation, based upon this rotation, and detects a steering angle of the steering wheel 51.

Advantageous Effect(s) of the Embodiment(s)

The embodiment of the present invention is directed to a rotary connector device 1, having: a body 3 which is supported at a combination switch side and is adapted to pass a steering shaft; a rotor 5 adapted to pass the steering shaft; and an attachment 33 adapted to rotatably couple the rotor 5 to the body 3 and conjunctively rotate relative to the rotor 5, sensor-engagement recessed portions 41, 43 engaging with a steering-angle sensor 45 to transmit a rotation, the recessed portion being provided at the attachment 33, wherein wheel-engagement protrusions 37, 39 engaging with a steering wheel is provided at the attachment.

Thus, between the steering wheel 51 and the steering-angle sensor 45, a rotation angle can be transmitted owing to two engagements between the steering wheel 51 and the attachment 33 and between the attachment 33 and the steering-angle sensor 45, an increase of a steering-angle detection error is restrained, and timely vehicle control can be performed.

The body 3 has the fixing-side hole portion 13, for passing the steering shaft, and the rotor 5 has the rotation-side hole portion 23, for passing the steering shaft similarly, respectively; the attachment 33 is cylindrically shaped, and is engagingly attached to the fixing-side hole portion 13 and the rotation-side hole portion 23; and the wheel-engagement protrusions 37, 39 are protruded in the axial direction of the steering shaft along an inner circumference of the rotation-side hole portion 23.

Therefore, the wheel-engagement protrusions 37, 39 can be engaged with the wheel-engagement recessed portions 53, 55 of the steering wheel 51 merely by mounting the steering wheel 51 to the steering shaft.

What is claimed is:

1. A rotary connector device, comprising:
    a fixing-side member which is supported at a stationary side and is adapted to pass a steering shaft;
    a rotation-side member adapted to pass the steering shaft; and
    an attachment adapted to rotatably couple the rotation-side member to the fixing-side member and conjunctively rotate relative to the rotation-side member, sensor-engagement portions engaging with a steering-angle sensor to transmit a rotation, the sensor-engagement portions being provided at the attachment,
    wherein wheel-engagement portions engaging with a steering wheel are provided at the attachment.

2. The rotary connector device according to claim 1, wherein:
    the fixing-side member has a fixing-side hole portion, for passing the steering shaft, and the rotation-side member has a rotation-side hole portion, for passing the steering shaft similarly, respectively;
    the attachment is cylindrically shaped, and is engagingly attached to the fixing-side hole portion and the rotation-side hole portion; and
    the wheel-engagement portion is protruded in an axial direction of the steering shaft, along an inner circumference of the rotation-side hole portion.

* * * * *